R. E. KOLSHORN.
MEANS FOR AGITATING BATH WATER.
APPLICATION FILED AUG. 12, 1919.

1,350,974.   Patented Aug. 24, 1920.

WITNESS:
Benj. Kahn

INVENTOR.
BY R.E. Kolshorn.
Victor J. Evans
ATTORNEY.

UNITED STATES PATENT OFFICE.

REYNOLD EUGENE KOLSHORN, OF RED WING, MINNESOTA.

MEANS FOR AGITATING BATH-WATER.

1,350,974.

Specification of Letters Patent.

Patented Aug. 24, 1920.

Application filed August 12, 1919. Serial No. 317,014.

*To all whom it may concern:*

Be it known that I, REYNOLD E. KOLSHORN, a citizen of the United States, residing at Red Wing, in the county of Goodhue and State of Minnesota, have invented new and useful Improvements in Means for Agitating Bath-Water, of which the following is a specification.

This invention relates to means for agitating the water in bath tubs, and the principal object of the invention is to provide means for introducing air at the bottom of the tub so that the same will pass through the water and thus aerate and agitate the same.

Another object of the invention is to provide means whereby the air may be heated before being introduced into the water so that such air may be used as a means of heating the water and hold it at a constant temperature.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which.

Figure 1:
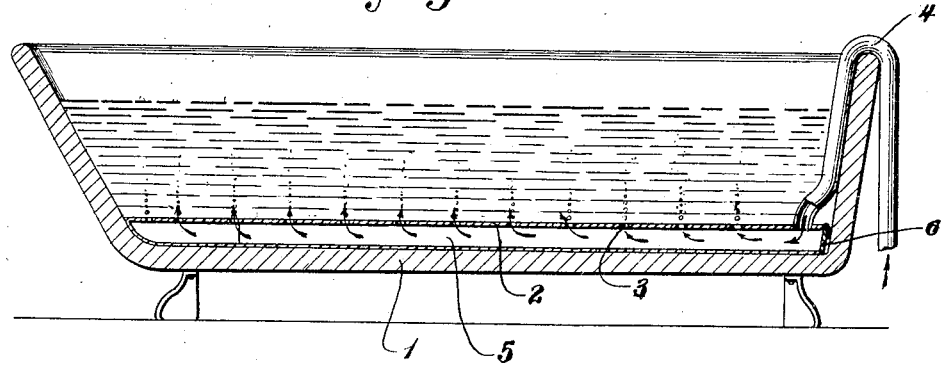
Figure 1 is a longitudinal sectional view of the invention applied to a bath tub.
Figure 2:
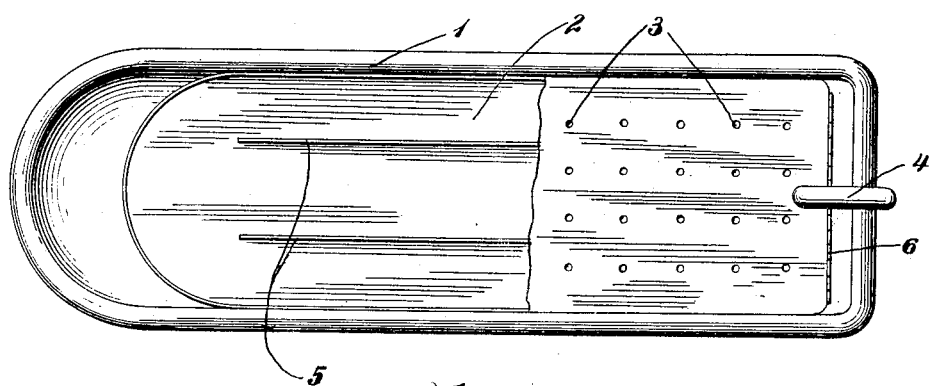
Fig. 2 is a plan view of the air distributing casing with parts broken away to show its interior construction.
Figure 3:
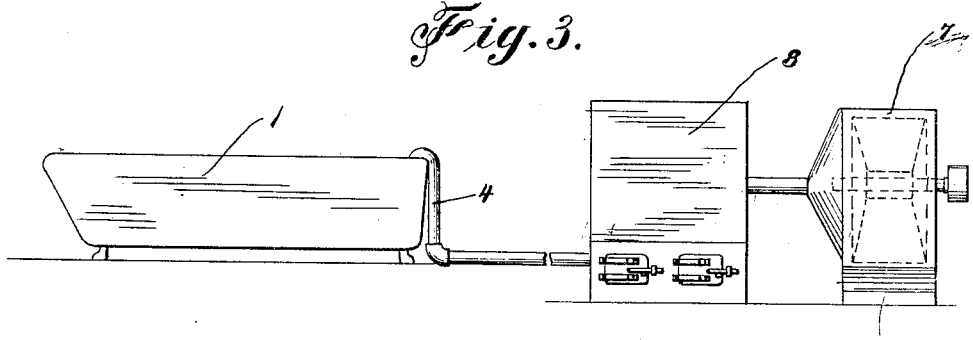
Fig. 3 shows an arrangement whereby the air may be heated before being introduced into the casing.

Referring to Figs. 1, 2 and 3, 1 indicates the bath tub which may be of any desired type. Resting upon the bottom of this tub is a casing 2 which has its upper wall perforated as at 3. A tube 4 has one end passing through said upper wall and is suitably fastened therein in an air-tight manner. Baffle plates 5 are arranged in said casing for evenly distributing the air flowing through the tube to the perforations. The front end of the casing is provided with a tight door 6 whereby access may be had to the casing when desired. The tube 4 leads to a suitable source of compressed air, shown as a blower 7 in Fig. 3, and if desired I may connect the tube with a heater 8, of any desired type, so that the air is heated before entering the casing.

It will thus be seen that when the tub is filled with water and the air turned on, said air will pass through the water so as to thoroughly agitate the same, and, if the heater is operating, the heated air will heat the water so that said water will remain at a constant temperature. The invention can be used with advantage for keeping salt and the like thoroughly mixed with the water and preventing it from settling upon the bottom of the tub. This air will also bring all foreign matter to the top so that it will be carried off by the overflow. So that in this way the air will keep the water pure. By means of the heater the bath can be taken at a mild heat and then gradually increased to the desired temperature.

It will be seen that my invention may be used for washing clothes as by placing the clothes in the tub and then agitating the water by the air the clothes will be cleansed.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In combination with a bath tub, a casing resting on the bottom thereof and having its top perforated, baffle plates in said casing, means for introducing heated air into said casing and a door at one end of the casing.

In testimony whereof I affix my signature.

REYNOLD EUGENE KOLSHORN.